Feb. 12, 1929.
H. WALKER
VIBRATION DAMPING MECHANISM
Original Filed May 15, 1925
1,701,519
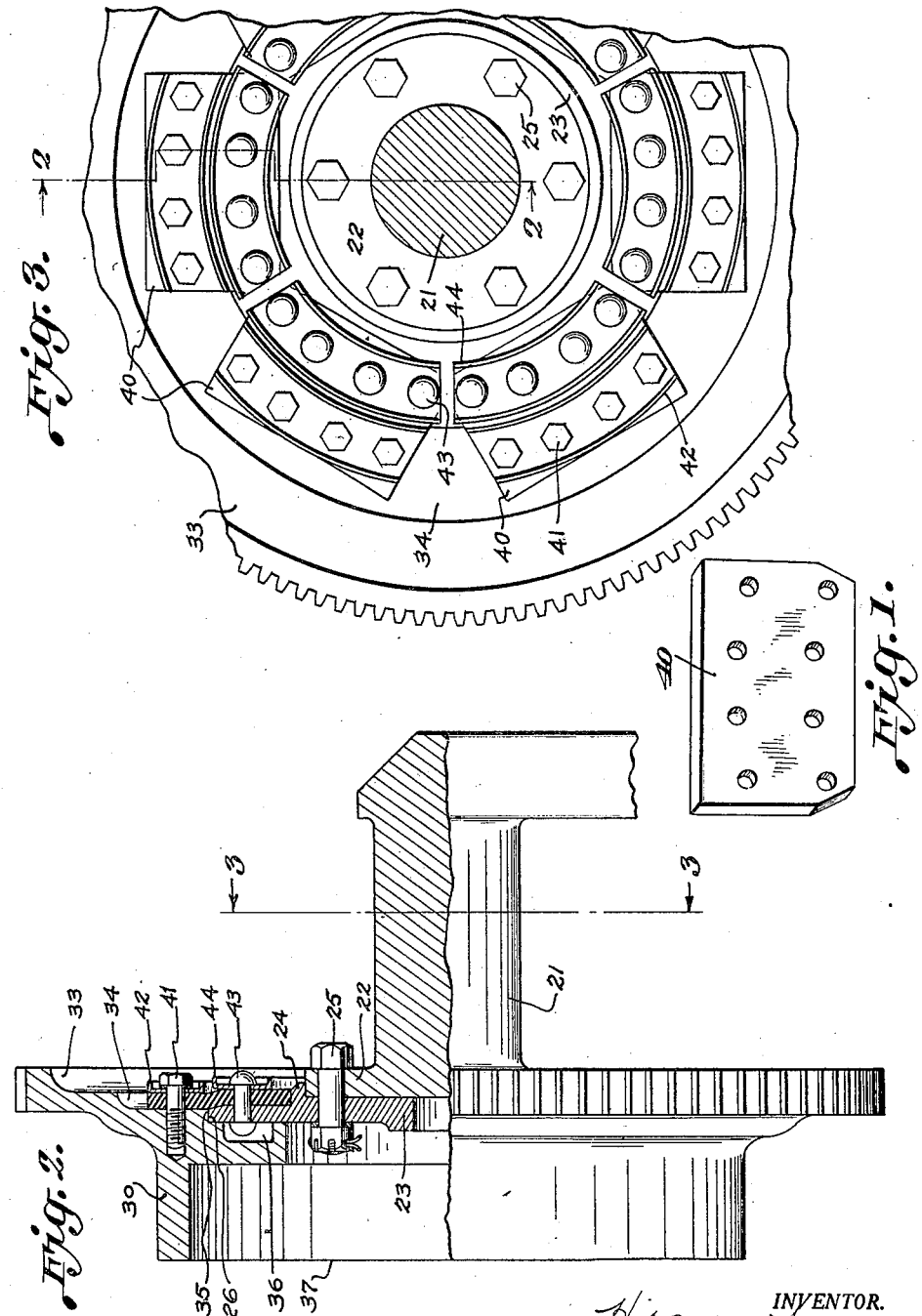
INVENTOR.
Hiram Walker
BY
Albert W. Austin
ATTORNEYS.

Patented Feb. 12, 1929.

1,701,519

UNITED STATES PATENT OFFICE.

HIRAM WALKER, OF CLEVELAND, OHIO, ASSIGNOR TO CHANDLER MOTOR CAR COMPANY, OF CLEVELAND, OHIO, A CORPORATION OF OHIO.

VIBRATION-DAMPING MECHANISM.

Application filed May 15, 1925, Serial No. 30,544. Renewed May 9, 1928.

This invention relates to vibration damping devices for controlling and suppressing the vibration in rotating machine elements.

It is well known that a shaft driven by an internal combustion engine, such as a hydrocarbon engine is subjected to static and dynamic unbalances as well as tortional deflection, due to the intermittent applications of power thereto.

This invention relates particularly to the elimination of tortional deflections and from corresponding vibration of the parts or any of them to which the engine may be connected which may be cumulatively set up due at least in part to resonance with the period of the vibrations of the engine.

The invention also relates to the provision of a flexible or yielding connection between an internal combustion engine and any torque restricting element associated therewith. A direct or inflexible connection tends to restrict the rotation of the crankshaft of the engine and results in a definite deflection in the shaft on each impulse of the engine. The present invention contemplates the elimination of such tortional deflection from whatever cause, as well as the undesirable effects thereof so that vibration of any part which happens to have a natural period which is in resonance with the spaced explosions of the engine is effectively suppressed. It will be understood, therefore, that the invention may be employed in a variety of combinations in connection with an engine, and in addition to the specific field of usefulness hereinafter illustrated may be employed elsewhere to advantage. For example, the invention would be equally applicable with an engine having a flywheel at the front end of its shaft and a clutch and power transmission at the other end of its shaft.

The invention also relates to an improved construction of the momentum member, which will permit it to be arranged in a plane normal to the axis of the engine shaft, whereby it will have the appearance and the general characteristics of a fly wheel, but the principal mass will be connected so as to have a slight rotary movement relative to the shaft itself.

Various other objects and advantages of the invention will be obvious from the following particular description of one form of mechanism embodying my invention or from an inspection of the drawings which will be understood to be illustrative merely of one means of carrying out my invention, which further consists in certain new and novel features of construction and combinations of parts hereinafter set forth and claimed.

In the drawings,

Figure 1 is an isometric view of one of the yielding members connecting the two parts of the device constituting the fly wheel element of the engine;

Figure 2 represents an elevation partly in section of the crank shaft of an engine provided with a fly wheel element embodying the invention, the section being taken along the line 2—2 of Figure 3; and Figure 3 is an end view of the fly wheel element which is taken partly in section on the line 3—3 of Figure 2.

The engine includes a usual crank shaft 21 which terminates in a shoulder 22 to which is secured a driving plate 23 of steel or other metal having a head 24 snugly engaging the periphery of the flange 22 and secured thereto by suitable means as a plurality of bolts 25. The outer periphery 26 of the driving plate is preferably formed with a smooth circular surface.

A momentum element 30 having a relatively large mass and constructed to withstand high centrifugal stresses is provided and formed with an annular flange or ring. One side or face of this flange is provided with recesses of progressively increasing depth. A recess 33 is of relatively large diameter, and a recess 34 is of less diameter. A third recess has a defined edge or rim 35, which is coextensive with the driving plate 23, and is formed so that the element 30 rides easily upon the plate 23 and is rotatable with respect thereto. A plurality of spaced recesses such as 36 are also provided for a purpose which will subsequently appear. The other transverse surface 37 of the momentum element 30 cooperates with a clutch element (not shown) to form a conventional clutch of any suitable construction.

When the engine is in operation its power is transmitted to the driving plate 23. The flywheel element 30, rides upon the plate 23 and as the crankshaft rotates it drags the flywheel element 30 with it.

For the purpose of limiting the relative movement and of damping vibration between the crank shaft and the momentum element 30 there are provided a plurality of rectangularly shaped flexible members, 40—40. Each of these members has two series of perforations, and is fastened to the momentum element 30 by bolts 41 passing therethrough and into screwthreaded drill holes in the momentum element 30. A contact plate 42 comprising a U shaped bar of metal is placed under the heads of the bolts 41 relating to each flexible member 40 so as to secure a good grip upon the respective flexible member without mutilating it. Each flexible member is also fastened to the drive plate 23 by rivets 43, each set of rivets having a contact plate 44 comprising a U-shaped bar of metal under their heads so as to secure a good grip upon the respective flexible member without mutilating it. The shanks of the rivets 43 pass through the material of the respective flexible member and of the drive plate 23 and into a recess 36 in the flywheel element 30 provided for that purpose and which is made sufficiently large to accommodate the heads of the rivets. The flexible members 40 are made of a suitable material, such as rubber of great toughness, conventional automobile brake lining fabric or other strong flexible material.

Thus it will be seen that there is provided a structure which permits of transmitting the intermittent power without appreciable crank shaft deflection. A flywheel used in combination with a multi cylinder combustion engine is subjected to loads varying from maximum to minimum several times per revolution, and when this variation is synchronized with the natural wave cycle of the crank shaft there is a tendency to produce a pronounced vibration. This tendency is effectively minimized by the construction herein illustrated and the disturbing vibrations are stopped.

Having thus described my invention I claim:

A multipart flywheel comprising a relatively massive element provided with a plurality of recesses of progressively increasing depth and progressively reduced diameter, a driving disc having a machined edge snugly fitting into one of said recesses and rotatable with respect to said element, and a plurality of yielding elements interconnecting said disc and element and positioned in the plane of a different one of the recesses.

In testimony whereof I have hereunto set my hand.

HIRAM WALKER.